United States Patent
Schneider et al.

(10) Patent No.: US 10,641,288 B2
(45) Date of Patent: May 5, 2020

(54) METHOD FOR OPERATING A COMPRESSOR OF A TURBOMACHINE COMPRISING PROVIDING A PLURALITY OF STAGES IN A FRONT COMPRESSOR AREA, A REAR COMPRESSOR AREA, AND ALLOWING A SWIRL IN THE REAR COMPRESSOR AREA

(71) Applicant: MTU Aero Engines AG, Munich (DE)

(72) Inventors: Tim Schneider, Munich (DE); Sergio Elorza Gomez, Munich (DE)

(73) Assignee: MTU Aero Engines AG, Munich (DE)

( * ) Notice: Subject to any disclaimer, the term of this patent is extended or adjusted under 35 U.S.C. 154(b) by 320 days.

(21) Appl. No.: 15/359,113

(22) Filed: Nov. 22, 2016

(65) Prior Publication Data

US 2017/0146025 A1    May 25, 2017

(30) Foreign Application Priority Data

Nov. 24, 2015 (DE) .......... 10 2015 223 210

(51) Int. Cl.
*F04D 29/54* (2006.01)
*F01D 5/14* (2006.01)
(Continued)

(52) U.S. Cl.
CPC ........... *F04D 29/541* (2013.01); *F01D 5/146* (2013.01); *F04D 19/00* (2013.01); *F04D 19/028* (2013.01);
(Continued)

(58) Field of Classification Search
CPC ...... F04D 29/541; F04D 19/00; F04D 19/028; F04D 29/324; F04D 29/522; F04D 29/544; F04D 29/54; F01D 5/146; Y02T 50/673
See application file for complete search history.

(56) References Cited

U.S. PATENT DOCUMENTS 3,248,081 A * 4/1966 Bobo .................. F01D 5/323
                                                    416/191
4,652,208 A    3/1987 Tameo
(Continued)

FOREIGN PATENT DOCUMENTS

CH    219738    2/1942
DE    312856    9/1914
(Continued)

OTHER PUBLICATIONS

Philip G Hill, Mechanics and Thermodynamics of Propulsion, 1970, Addison-Wesley Publishing, Third Printing, pp. 238-277 ( Year: 1970).*

*Primary Examiner* — Alexander B Comley
*Assistant Examiner* — Benjamin Doyle
(74) *Attorney, Agent, or Firm* — Davidson, Davidson & Kappel, LLC

(57) ABSTRACT

Described is a method for operating a compressor of a turbomachine, in which, when considered in the direction of a main flow, an, in particular, radially averaged degree of reaction has dropped in a front compressor area from a maximum to a minimum, is held constant or virtually constant across a central compressor area up into a rear compressor area, an, in particular, radially averaged degree of reaction being adjusted in the rear compressors area which is closer to the minimum than to the maximum, and a residual swirl of at least 47° is present in the middle section, and a compressor and a turbomachine.

8 Claims, 2 Drawing Sheets

(51) Int. Cl.
*F04D 19/02* (2006.01)
*F04D 29/32* (2006.01)
*F04D 19/00* (2006.01)
*F04D 29/52* (2006.01)

(52) U.S. Cl.
CPC ......... *F04D 29/324* (2013.01); *F04D 29/522* (2013.01); *F04D 29/544* (2013.01); *Y02T 50/673* (2013.01)

(56) References Cited

U.S. PATENT DOCUMENTS

| | | | | |
|---|---|---|---|---|
| 4,989,406 | A | * | 2/1991 | Vdoviak .............. F01D 25/162 244/117 A |
| 6,345,952 | B1 | | 2/2002 | Oeynhausen et al. |
| 9,470,091 | B2 | | 10/2016 | Gomez et al. |

FOREIGN PATENT DOCUMENTS

| | | | | |
|---|---|---|---|---|
| DE | 3618331 | | 12/1986 | |
| DE | 19701020 | | 7/1998 | |
| DE | 102009037956 | | 12/2009 | |
| DE | 102011120167 | | 6/2013 | |
| EP | 2431577 | | 3/2012 | |
| EP | 2431577 A2 | * | 3/2012 | ............ F01D 5/142 |
| EP | 2626515 | | 8/2013 | |
| EP | 3032032 | | 6/2016 | |
| GB | 710300 | | 6/1954 | |
| GB | 1153134 | | 5/1969 | |

* cited by examiner

METHOD FOR OPERATING A COMPRESSOR OF A TURBOMACHINE COMPRISING PROVIDING A PLURALITY OF STAGES IN A FRONT COMPRESSOR AREA, A REAR COMPRESSOR AREA, AND ALLOWING A SWIRL IN THE REAR COMPRESSOR AREA

This claims the benefit of German Patent Application DE 102015223210.7, filed Nov. 24, 2015 and hereby incorporated by reference herein.

The invention relates to a method for operating a compressor of a turbomachine, a compressor of a turbomachine, and a turbomachine.

BACKGROUND

In conventional axial compressors of turbomachines, such as aircraft engines and static gas turbines, a radially averaged degree of reaction in the front compressor area drops from an inlet-side maximum to a minimum. The local degree of reaction may be calculated in a simplified way according to the following formula, based on metal angles:

$$R = \frac{\tan\frac{\beta_1 + \beta_2}{2}}{\tan\frac{\beta_1 + \beta_2}{2} + \tan\frac{\alpha_1 + \alpha_2}{2}}$$

The angles $\alpha_1$, $\alpha_2$, $\beta_1$, $\beta_2$ are, as shown in FIG. 1, marked between tangents of the respective camber line and an axial flow direction x of the turbomachine. $\alpha_1$ is marked from the trailing edge of a guide blade 2 of a row of guide blades n−1. $\alpha_2$ is marked toward the leading edge of a guide blade 4 of a row of guide blades n. $\beta_1$ is marked toward the leading edge of a moving blade 6 of a row of guide blades n. $\beta_2$ is marked from the trailing edge of moving blade 6 of a row of moving blades n. Moving blade 6 or row of moving blades n thereby passes through between guide blades 2, 4 or rows of guide blades n−1, n in circumferential direction u. Letter n designates whole number multiples of 1, 2, etc. Usually, the degree of reaction for compressors covers a range between 0.5 and 1.0. Turbines usually cover degrees of reaction from 0.0 . . . 0.05 through 0.5. The drop of the degree of reaction upstream from the first non-adjustable guide baffle is followed by a rise of the degree of reaction up to the compressor outlet in known turbomachines. Due to the rise, a residual swirl in the main flow may be reduced in the rear compressor area and in particular at the outlet guide baffle of the compressor; however, the rise causes a high load on the rear stages, which results in reductions in efficiency.

SUMMARY OF THE INVENTION

It is an object of the present invention to provide a method for operating a compressor of a turbomachine which has a high efficiency. In addition, it is the object of the present invention to create a compressor of a turbomachine with a high efficiency, and a turbomachine with a high efficiency.

In one method according to the present invention for operating a compressor of a turbomachine, for example, an aircraft engine, an, in particular, radially averaged degree of reaction, which, when viewed in the direction of a main flow, has dropped in a front compressor area from a maximum to a minimum, is held constant or virtually constant across a central compressor area up into a rear compressor area, in the rear compressor area an, in particular, radially averaged degree of reaction being set which is closer to the minimum than to the maximum. In addition, a residual swirl of at least 47° is set in the middle section.

The rotor mach numbers are held low due to the low degree of reaction up into the rear compressor area and thus due to the not rising or not essentially rising degree of reaction from the compressor center up to the compressor outlet. This leads to an improvement of the efficiency of the stages. The rear stages are relieved except for an outlet guide baffle, whereby the stator blade numbers may be reduced. Thus, an improvement of the compressor efficiency is achieved compared to conventional turbomachines. The compressor according to the present invention thus has a high efficiency. The blades may also be aligned with one another in such a way that a residual swirl in the rear compressor area may be reduced by 50° to 60°.

Particularly favorable results may be achieved if the radially averaged degree of reaction is adjusted from the minimum up to the rear compressor area by close to 0.5 or slightly higher, for example, up to 10% higher.

A value of the degree of reaction may be reduced to half of the radial height between the compressor hub and the compressor housing with respect to an average value of the linear radial curve. Due to this measure, the degree of reaction is increased in the sidewall areas of the ring chamber, through which the main flow flows, which effectuates a stabilization of the boundary layers and thus a reduction of sidewall losses. This, in turn, increases the surge margin.

A compressor of a turbomachine according to the present invention has a blade alignment or a blade arrangement of this type such that a degree of reaction is set in the rear compressor area which is closer to the minimum than to the maximum, and a residual swirl of at least 47° is present in the middle section.

To suppress the degree of reaction and to reduce the residual swirl, an outlet guide baffle may, for example, have a hub-side and/or a housing-side sidewall contouring. Preferably, the at least one sidewall contouring is not circumferentially symmetrical.

Alternatively or additionally to the sidewall contouring, the compressor may have an outlet guide baffle in a tandem form with two, three, or more rows of blades for adjusting the low degree of reaction and for reducing the residual swirl in the rear compressor area.

A preferred turbomachine includes a compressor according to the present invention or a compressor which is operated according to the method according to the present invention. Consequently, the turbomachine is characterized by a high efficiency.

Other advantageous exemplary embodiments of the present invention are the subject matter of additional subclaims.

BRIEF DESCRIPTION OF THE DRAWINGS

Preferred exemplary embodiments of the present invention are subsequently described in greater detail with the aid of schematic illustrations.

DETAILED DESCRIPTION

Figure 1:
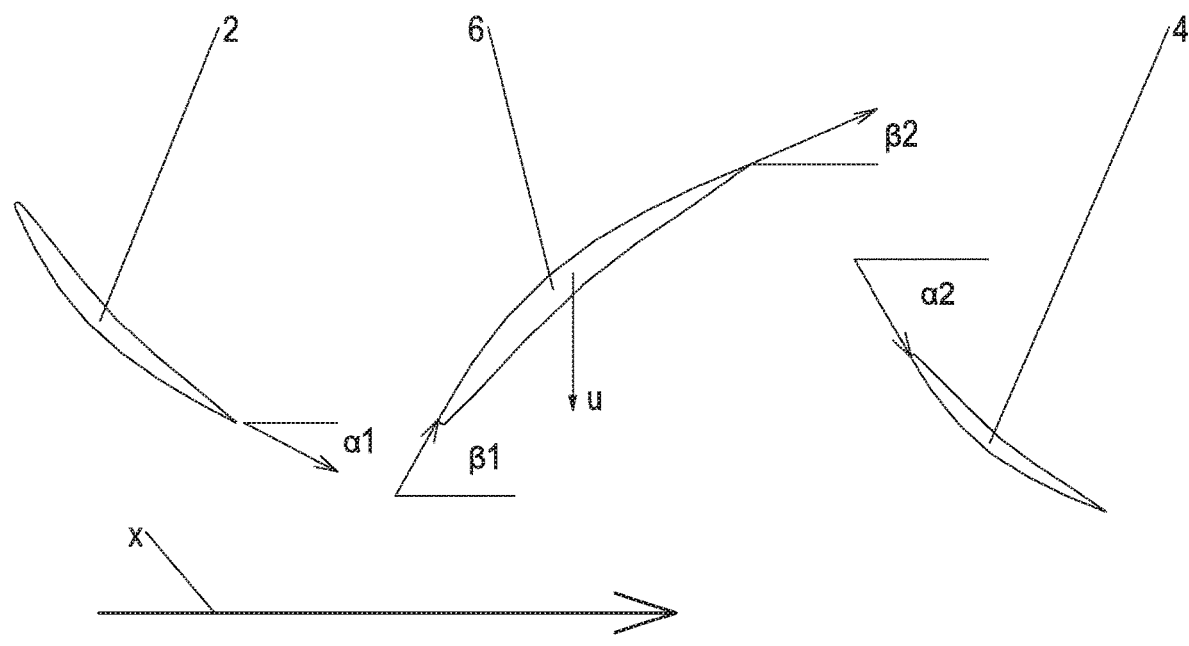
FIG. 1 shows a diagram to define a compressor-side degree of reaction.

As already mentioned at the outset, FIG. 1 shows how a compression-side degree of reaction of a turbomachine may be calculated. This calculation or this understanding is also based on the degrees of reaction according to the present invention.

The local degree of reaction R is consequently calculated according to the following formula:

$$R = \frac{\tan\frac{\beta 1 + \beta 2}{2}}{\tan\frac{\beta 1 + \beta 2}{2} + \tan\frac{\alpha 1 + \alpha 2}{2}}$$

The angles $\alpha 1$, $\alpha 2$, $\beta 1$, $\beta 2$ are, as shown in FIG. 1, are marked between tangents of the respective camber line and an axial flow direction x of the turbomachine. $\alpha 1$ is marked from the trailing edge of a guide blade 2 of a row of guide blades n−1. $\alpha 2$ is marked toward the leading edge of a guide blade 4 of a row of guide blades n. $\beta 1$ is marked toward the leading edge of a moving blade 6 of a row of moving blades n. $\beta 2$ is marked from the trailing edge of moving blade 6 of a row of moving blades n. Moving blade 6 or row of moving blades n thereby passes through between guide blades 2, 4 or rows of guide blades n−1, n in circumferential direction u. Letter n designates whole number multiples of 1, 2, etc.

Figure 2:
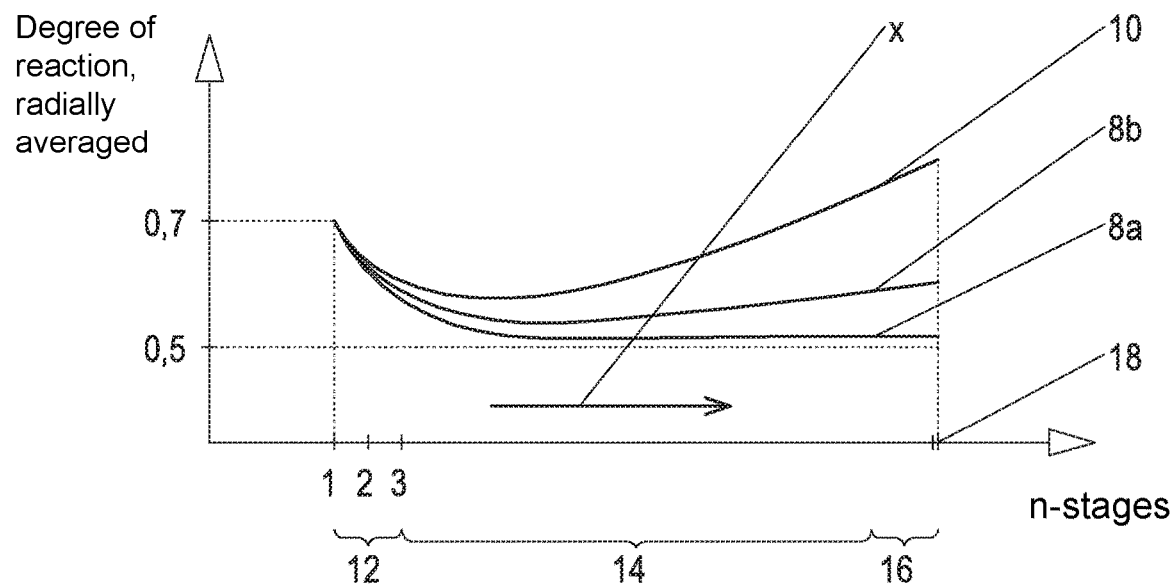
FIG. 2 shows curves of the radially averaged degree of reaction according to the present invention in the longitudinal compressor direction in comparison to a curve of a known compressor-side degree of reaction.

FIG. 2 shows curves according to the present invention of a radially averaged degree of reaction 8a, 8b of a compressor of a turbomachine, in particular an aircraft engine, in comparison to a conventional curve of a radially averaged degree of reaction 10.

Degrees of reaction 8a, 8b, 10 are outlined in the longitudinal direction of the compressor or in flow direction x of a main flow flowing through the turbomachine across a front compressor area 12, a central compressor area 14, and a rear compressor area 16. Front compressor area 12 is formed on the stator side, for example, by three adjustable rows of guide blades. Central compressor area 14 has on the stator side a plurality of non-adjustable rows of guide blades. Rear compressor area 16 has on the stator side, in addition to a plurality of non-adjustable rows of guide blades, an outlet guide baffle 18, in particular as a last row of guide blades. The dimensions of compressor areas 12, 14, 16 shown in FIG. 2 in flow direction x are purely exemplary and may also naturally vary. Thus, for example, front area 12 may also have fewer than three rows of guide blades or more than three adjustable rows of guide blades, such as, for example, five rows of guide blades.

Conventionally, radially averaged degree of reaction 10 drops in front compressor area 12 from a maximum, for example 0.7, sharply to a minimum, for example 0.6. At the beginning of central compressor area 14, conventional degree of reaction 10 rises slowly up to outlet guide baffle 18 of rear compressor area 16. Consequently, all guide blades in central compressor area 14 and in rear compressor area 16 are strongly loaded and the efficiency in rear compressor area 16 decreases sharply.

According to the present invention, degree of reaction 8a, 8b is now adjusted in such a way that, after the sharp drop in front compressor area 12 from a maximum to a minimum, it is held constant or virtually constant at the minimum, in this case 0.5, across central compressor area 14 up into rear compressor area 16 and in particular up to outlet guide baffle 18. Consequently, the stator-side load of rear compressor area 16 is generally reduced and thus the efficiency is increased. Only outlet guide baffle 18 is strongly loaded by the residual swirl of the main flow, which is to be reduced. Preferably, a residual swirl of at least 47° in relation to flow direction x is present in the middle section. Residual swirl angles of 50° to 60° are also possible.

Structurally, the degree or reaction curves according to the present invention may be achieved in that either a stator-side and/or rotor-side sidewall contouring, such as hub-side sidewall contouring 128 or housing-side sidewall contouring 130 (shown schematically in FIG. 3), preferably a non-circumferentially symmetrical sidewall contouring, is carried out in outlet guide baffle 18 (degree of reaction 8b). Alternatively or supplementally, outlet guide baffle 18 is designed in a tandem form shown schematically in FIG. 2 (degree of reaction 8a). Consequently, the degree of reaction curve may fundamentally be held closer to the minimum than in the case of pure sidewall contouring.

Figure 3:
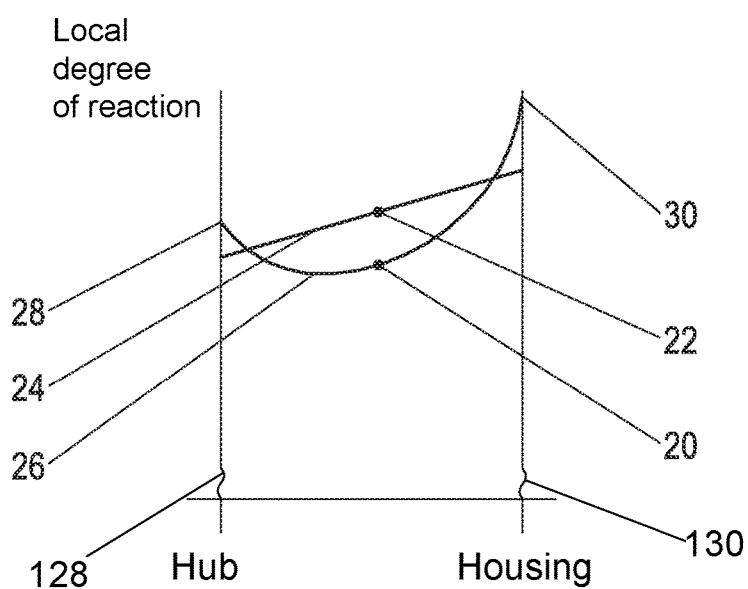
FIG. 3 shows a radial curve of a degree of reaction according to the present invention in comparison to a radial curve of a known compressor-side degree of reaction.

According to FIG. 3, it is preferred if an average value 20 of degree of reaction 8a, 8b at half the radial height between the compressor hub and the compressor housing is reduced compared to an average value 22 at a linear radial curve 24. Linear curve 24 is thereby such that a hub-side value 28 of the degree of reaction is lower than a housing-side value 30 of degree of reaction 8a, 8b. Due to the reduction of the average degree of reaction value, a trough-shaped radial curve 26 or degrees of reaction 8a, 8b results, whereby the sidewall-side degree of reaction values 30, 28 are increased compared to linear curve 24. This effectuates a stabilization of the sidewall boundary layer and thus results in an increase of the surge margin so that the stability of the compressor is increased due to the reduction of the average value of degree of reaction 8a, 8b compared to an original linear curve 24.

A method for operating a compressor of a turbomachine is described, in which, when considered in the direction of a main flow, an, in particular, radially averaged degree of reaction has dropped in a front compressor area from a maximum to a minimum, is held constant or virtually constant across a central compressor area up into a rear compressor area, an, in particular, radially averaged degree of reaction being adjusted in the rear compressor area which is closer to the minimum than to the maximum, and a residual swirl of at least 47° being present in the middle section, and a compressor and a turbomachine.

LIST OF REFERENCE NUMERALS 2 guide blade—stage n−1
4 guide blade—stage n
6 moving blade—stage n
8a degree of reaction
8b degree of reaction
10 degree of reaction
12 front compressor area
14 central compressor area
16 rear compressor area
18 outlet guide baffle, tandem
20 average value
22 average value
24 linear curve
26 trough-shaped curve
28 hub-side value
30 housing-side value
128 hub-side sidewall contouring 130 housing-side sidewall contouring
R degree of reaction
x flow direction
u circumferential direction

What is claimed is:

1. A method for operating a compressor of a turbomachine, the method comprising:
    providing a plurality of stages in a front compressor area so that a radially averaged degree of reaction in the front compressor area drops, with respect to a main flow direction, from a maximum at a first stage of the plurality of stages in the front compressor area to a front compressor area minimum at a further stage of the plurality of stages of the front compressor area downstream from the first stage;
    providing a rear compressor area with a plurality of rear compressor area stages and an outlet guide baffle so that the radially averaged degree of reaction of the plurality of rear compressor area stages in the rear compressor area is closer to the front compressor area minimum than to the maximum; and
    the rear compressor area allowing a swirl in the rear compressor area downstream from at least one of the plurality of rear compressor stages in front of the outlet guide baffle to be between 47° and 60° in a middle section.

2. The method as recited in claim 1 wherein the degree of reaction is adjusted to equal 0.5 to 0.6.

3. The method as recited in claim 1 wherein a value of a local degree of reaction at half a radial height between a compressor hub and a compressor housing is less than each of a hub-side degree of reaction and a housing-side degree of reaction.

4. The method as recited in claim 1 wherein the front compressor area has a plurality of rows of adjustable guide blades, central compressor area between the front compressor area and the rear compressor area has a plurality of nonadjustable rows of guide blades, and rear compressor area has a plurality of rows of nonadjustable guide blades and a last row of guide blades defining the outlet guide baffle.

5. A method for operating a compressor of a turbomachine, the compressor having a front compressor area having a plurality of rows of adjustable guide blades, a central compressor area having a plurality of nonadjustable rows of guide blades, and a rear compressor area having a plurality of rows of nonadjustable guide blades and a last row of guide blades defining an outlet guide baffle, the method comprising:
    providing a plurality of stages in a front compressor area so that a radially averaged degree of reaction in the front compressor area drops, with respect to a main flow direction, from a maximum at a first stage of the plurality of stages in the front compressor area to a front compressor area minimum at a further stage of the plurality of stages of the front compressor area downstream from the first stage;
    providing a rear compressor area with a plurality of rear compressor area stages and an outlet guide baffle so that the radially averaged degree of reaction of the plurality of rear compressor area stages in the rear compressor area is closer to the front compressor area minimum than to the maximum; and
    the rear compressor area allowing a swirl angle in the rear compressor area downstream from at least one of the plurality of rear compressor stages in front of the outlet guide baffle to be between 50° and 60° in a middle section.

6. The method as recited in claim 5 wherein the radially averaged degree of reaction is adjusted to equal 0.5 or higher.

7. The method as recited in claim 5 wherein a value of a local degree of reaction at half a radial height between a compressor hub and a compressor housing is less than each of a hub-side degree of reaction and a housing-side degree of reaction.

8. The method as recited in claim 1 wherein a value of a local degree of reaction at half a radial height between a compressor hub and a compressor housing is less than at least one of a hub-side degree of reaction and a housing-side degree of reaction.

* * * * *